United States Patent
Wang et al.

(10) Patent No.: US 12,510,488 B2
(45) Date of Patent: Dec. 30, 2025

(54) FLUORINE-DOPED CARBON DOT (CD)-MODIFIED ENRICHMENT CHROMOGENIC MEMBRANE AND USE THEREOF IN DETECTION OF THREE PERFLUORINATED COMPOUNDS (PFCS)

(71) Applicant: Tiangong University, Tianjin (CN)

(72) Inventors: Jie Wang, Tianjin (CN); Yang Yuan, Tianjin (CN); Hui Jia, Tianjin (CN); Xu Zhu, Tianjin (CN); Jialei Cao, Tianjin (CN)

(73) Assignee: Tiangong University, Tianjin (CN)

( * ) Notice: Subject to any disclaimer, the term of this patent is extended or adjusted under 35 U.S.C. 154(b) by 0 days.

(21) Appl. No.: 19/213,784

(22) Filed: May 20, 2025

(65) Prior Publication Data

US 2025/0283830 A1  Sep. 11, 2025

(30) Foreign Application Priority Data

Jan. 21, 2025 (CN) .......................... 202510090320.9

(51) Int. Cl.

| | | |
|---|---|---|
| *G01N 21/78* | (2006.01) | |
| *B01L 3/00* | (2006.01) | |
| *B82Y 40/00* | (2011.01) | |
| *G01N 21/01* | (2006.01) | |
| *G01N 21/77* | (2006.01) | |
| *G01N 31/22* | (2006.01) | |
| *G01N 33/18* | (2006.01) | |
| *B82Y 30/00* | (2011.01) | |

(52) U.S. Cl.
CPC ........ *G01N 21/78* (2013.01); *B01L 3/502715* (2013.01); *G01N 31/22* (2013.01); *G01N 33/1826* (2013.01); *B82Y 30/00* (2013.01); *B82Y 40/00* (2013.01); *G01N 2021/0106* (2013.01); *G01N 2021/775* (2013.01)

(58) Field of Classification Search
CPC ... B01L 3/502715; B82Y 30/00; B82Y 40/00; G01N 21/78; G01N 31/22; G01N 33/1826
See application file for complete search history.

(56) References Cited

U.S. PATENT DOCUMENTS

| | | |
|---|---|---|
| 2011/0195507 A1 | 8/2011 | Dancer |
| 2019/0025223 A1 | 1/2019 | Aldasem |
| 2019/0086338 A1 | 3/2019 | Bailey |

FOREIGN PATENT DOCUMENTS

| | | | | |
|---|---|---|---|---|
| CN | 107529514 A | | 1/2018 | |
| CN | 109486482 A | * | 3/2019 | ............ B82Y 20/00 |
| CN | 118792043 A | | 10/2024 | |

OTHER PUBLICATIONS

Machine translation of Chinese Patent No. CN109486482A. (Year: 2019).*

* cited by examiner

*Primary Examiner* — Michael P Wieczorek

(57) ABSTRACT

A fluorine-doped CD is synthesized through one-pot solvothermal synthesis as follows: dissolving 4-(diethylamino) salicylaldehyde and sodium fluoride in deionized water to produce an aqueous solution, and ultrasonically mixing the aqueous solution with phosphoric acid thoroughly to produce a mixture; placing the mixture in a reactor lined with polytetrafluoroethylene (PTFE), and allowing a reaction for 1 h to 3 h under heating at 180° C. to 220° C.; cooling, and conducting centrifugation to remove unreacted raw materials; collecting a resulting supernatant, and conducting dialysis in a dialysis bag for 24 h to 48 h to produce a sample; and lyophilizing the sample to produce the fluorine-doped CD. The fluorine-doped CD is adopted as a chromogenic agent to achieve the detection of PFCs, and accordingly, a enrichment chromogenic membrane is prepared in combination with UiO-66-$F_4$. The enrichment chromogenic membrane allows convenient detection and can achieve the in-situ monitoring of three PFCs in water.

7 Claims, 12 Drawing Sheets

FLUORINE-DOPED CARBON DOT (CD)-MODIFIED ENRICHMENT CHROMOGENIC MEMBRANE AND USE THEREOF IN DETECTION OF THREE PERFLUORINATED COMPOUNDS (PFCS)

CROSS-REFERENCE TO RELATED APPLICATIONS

This application claims priority to Chinese Patent Application No. 202510090320.9 with a filing date of Jan. 21, 2025. The content of the aforementioned application, including any intervening amendments thereto, is incorporated herein by reference.

TECHNICAL FIELD

The present application relates to the technical field of detection, and specifically to a fluorine-doped carbon dot (CD)-modified enrichment chromogenic membrane and a use thereof in detection of three perfluorinated compounds (PFCs).

BACKGROUND

PFCs are a class of fluorine-containing organic compounds in which all hydrogen atoms are substituted by fluorine atoms. Due to the strong electronegativity of fluorine atoms, PFCs are extremely stable and chemically inert. As a result, PFCs can hardly be degraded in the environment. Perfluorooctane sulfonate (PFOS) and perfluorooctanoic acid (PFOA), as common PFCs, have been widely used in fields such as kitchenware, hydrophobic coatings, and food packaging materials. However, due to the potential toxicity and carcinogenicity, persistence in the environment, bioaccumulation, and long-range transport tendency of these PFCs, the long-term exposure or accumulation of these PFCs may pose potential risks to the human health and the environment, including endocrine disruption, liver damage, and ecosystem destruction. Therefore, it is very necessary to establish an effective analytical method for detecting PFCs in the environment. There are a great variety of PFCs classified into multiple categories based on structures and functions. Globally, PFCs are extensively used in industrial production and consumer goods. The proportions of different types of PFCs distributed and used in the environment vary greatly. Perfluorocarboxylic acids (such as PFOA), perfluorosulfonic acids (such as PFOS), and perfluoropolyethers (such as perfluoropropylvinyl ether (PPVE)) have the maximum proportions among PFCs. Thus, these three types of PFCs have become the primary focus of research.

CDs refer to a group of carbon-based nanomaterials with diameters typically of a few to several tens of nanometers. CDs are composed primarily of carbon atoms. CDs generally include functional groups of oxygen, nitrogen, or other elements, which enable exceptional optical properties such as intense fluorescence emission. Due to the excellent biocompatibility, low toxicity, and outstanding photostability of CDs, there are a wide range of applications of CDs in the fields of bioimaging, sensors, catalysis, and drug delivery.

Enrichment chromogenic membranes are a group of materials that combine a membrane separation technique with a chromogenic reaction. Enrichment chromogenic membranes are designed for the detection and concentration of specific target substances. Given the unique pore structure and surface functionalization of an enrichment chromogenic membrane, a target substance can be enriched on a surface of the enrichment chromogenic membrane, and react with a chromogenic reagent embedded in the enrichment chromogenic membrane to cause an obvious color change. This chromogenic reaction not only helps visualize a concentration of the target substance, but also improves the sensitivity and accuracy of detection. Because PFC-containing samples from aquatic environments have characteristics such as low concentration, complicated matrix, and large interference, these samples usually require a cumbersome pretreatment process. Therefore, it is of great significance to develop a degradable and eco-friendly enrichment chromogenic membrane for detecting PFOA, PFOS, and PPVE in aqueous environments that can effectively avoid the interference of other factors.

SUMMARY OF PRESENT INVENTION

In order to solve the above-mentioned technical problems, the present application is proposed. The embodiment of the present application provides a fluorine-doped CD-modified enrichment chromogenic membrane and a use thereof in detection of three PFCs. Accordingly, the present application solves the technical problem that PFC-containing samples from aquatic environments usually require a cumbersome pretreatment process because these samples have characteristics such as low concentration, complicated matrix, and large interference.

In a first aspect of the present application, the present application provides a preparation method of a fluorine-doped CD. The fluorine-doped CD is synthesized through one-pot solvothermal synthesis as follows: dissolving 4-(diethylamino)salicylaldehyde and sodium fluoride in water to produce an aqueous solution, and ultrasonically mixing the aqueous solution with phosphoric acid thoroughly to produce a mixture; placing the mixture in a reactor, and allowing a reaction under heating; cooling, and removing unreacted raw materials; collecting a resulting supernatant, and conducting dialysis to produce a sample; and lyophilizing the sample to produce the fluorine-doped CD (CDs-F).

In an embodiment, the 4-(diethylamino)salicylaldehyde, the sodium fluoride, and the phosphoric acid are in a volume ratio of (2-2.5):(1-2):(0.05-0.15).

In an embodiment, the reaction under heating is conducted at 180° C. to 220° C. and preferably 200° C., and/or, the reaction under heating is conducted for 1 h to 3 h and preferably 2 h; and/or, the dialysis is conducted in a dialysis bag for 24 h to 48 h.

In a second aspect of the present application, the present application provides a preparation method of a fluorine-doped CD-modified enrichment chromogenic membrane, including: preparation of a substrate membrane: modifying polyvinylidene fluoride (PVDF) to produce αAA-PVDF; dissolving the αAA-PVDF and polyvinylpyrrolidone in N,N-dimethylformamide (DMF), stirring at 60° C. to 70° C. for 10 h to 12 h, and allowing to stand for 10 h to 18 h to produce a mixed solution; pouring the mixed solution on a scrape-coating machine, and scrape-coating to form the substrate membrane; and soaking the substrate membrane in deionized water for later use; preparation of a tannic acid solution: dissolving a tannic acid powder in a phosphate buffer to produce the tannic acid solution; dispersing a fluorine-doped CD and UiO-66-$F_4$ in deionized water, and conducting an ultrasonic treatment to produce a dispersion of the UiO-66-$F_4$ and the fluorine-doped CD; and cutting the substrate membrane, and subjecting a cut substrate membrane to a static immersion in the tannic acid solution for 20 min to 60 min and then to a static immersion in the dispersion of the UiO-66-$F_4$ and the fluorine-doped CD for 20 min to 60 min to produce the enrichment chromogenic membrane modified with the UiO-66-$F_4$ and the fluorine-doped CD.

In an embodiment, the PVDF is modified through the following steps: step (1), dispersing a PVDF powder in a KOH solution at 50° C. to 60° C., adding ethanol, and stirring for 20 min to 60 min; and conducting suction filtration to collect an initial α-PVDF powder, washing the initial α-PVDF powder with deionized water until neutral to produce a wet α-PVDF powder, and drying the wet α-PVDF powder to produce a dry α-PVDF powder for later use; and step (2), adding the dry α-PVDF powder obtained in the step (1) to DMF, introducing nitrogen to expel oxygen for 20 min to 40 min, and stirring for dissolution; adding acrylic acid and 2,2'-azobis(isobutyronitrile), stirring at a constant temperature of 55° C. to 70° C. to allow a reaction for 8 h to 12 h; and adding methanol for precipitation to produce a precipitate, washing the precipitate with deionized water to produce a wet αAA-PVDF powder, and drying the wet αAA-PVDF powder to produce a dry αAA-PVDF powder for later use.

In an embodiment, during the preparation of the tannic acid solution, the tannic acid powder is dissolved in a phosphate buffer with a pH of 8 to produce the tannic acid solution, and a concentration of tannic acid in the tannic acid solution is 2 g/L to 4 g/L.

In an embodiment, a concentration of KOH in the KOH solution is 56 g/L.

In an embodiment, a concentration of each of the UiO-66-$F_4$ and the fluorine-doped CD in the dispersion of the UiO-66-$F_4$ and the fluorine-doped CD is 1 g/L.

In a third aspect of the present application, the present application provides a test kit, including an enrichment chromogenic membrane, a kit body, light sources, a collection window, a camera device mount, a camera device, a sample stage, a light source switch, and a microfluidic chip, where the enrichment chromogenic membrane is prepared by the preparation method described above. The collection window is formed at a top of the kit body, the sample stage is arranged on an inner wall of the bottom of the kit body, the collection window is arranged in parallel with the sample stage, and the microfluidic chip is placed on the sample stage. The light sources are arranged at the top of the kit body, and are symmetrically arranged at two sides of the collection window. The camera device mount is arranged at a side of the collection window, and the camera device is placed on the camera device mount. The microfluidic chip includes an upper chip, a lower chip, and a gasket. The upper chip is provided with a sample inlet, a microchannel, the enrichment chromogenic membrane, and a detection region. The sample inlet is formed at a central position of the upper chip. The detection region communicates with the sample inlet through the microchannel. The enrichment chromogenic membrane is placed in the detection region. The gasket is arranged at a bottom of the enrichment chromogenic membrane. The upper chip and the lower chip are connected together through the gasket.

In a fourth aspect of the present application, the present application provides a use of the novel fluorine-doped CD-modified enrichment chromogenic membrane described above or the test kit described above in detection of three PFCs.

The present application provides a fluorine-doped CD-modified enrichment chromogenic membrane and a use thereof in detection of three PFCs. In the present application, a fluorine-doped CD is synthesized through one-pot solvo-thermal synthesis as follows: 4-(diethylamino)salicylaldehyde and sodium fluoride are dissolved in water and then ultrasonically mixed with phosphoric acid thoroughly to produce a mixture. The mixture is placed in a reactor, heated to allow a reaction, and cooled. The unreacted raw materials are removed. A resulting supernatant is collected and subjected to dialysis to produce a sample. The sample is lyophilized to produce the fluorine-doped CD. A prepared PVDF-based substrate membrane is cut and subjected to a static immersion in a tannic acid solution for 20 min to 60 min and then to a static immersion in a dispersion of UiO-66-$F_4$ and the fluorine-doped CD for 20 min to 60 min to produce the enrichment chromogenic membrane. The fluorine-doped CD is adopted as a chromogenic agent to achieve the detection of PFCs, and accordingly, the enrichment chromogenic membrane is prepared in combination with UiO-66-$F_4$. The enrichment chromogenic membrane allows convenient detection and can achieve the in-situ monitoring of three PFCs in water.

BRIEF DESCRIPTION OF THE DRAWINGS

The above and other objectives, features, and advantages of the present application will become apparent through the detailed description of the embodiments of the present application in conjunction with the accompanying drawings. The accompanying drawings are provided for further comprehension of the embodiments of the present application and constitute a part of the specification. The accompanying drawings, together with the embodiments of the present application, are intended to explain rather than limit the present application. In the accompanying drawings, the same reference numerals usually represent the same components or steps.

Figure 1:
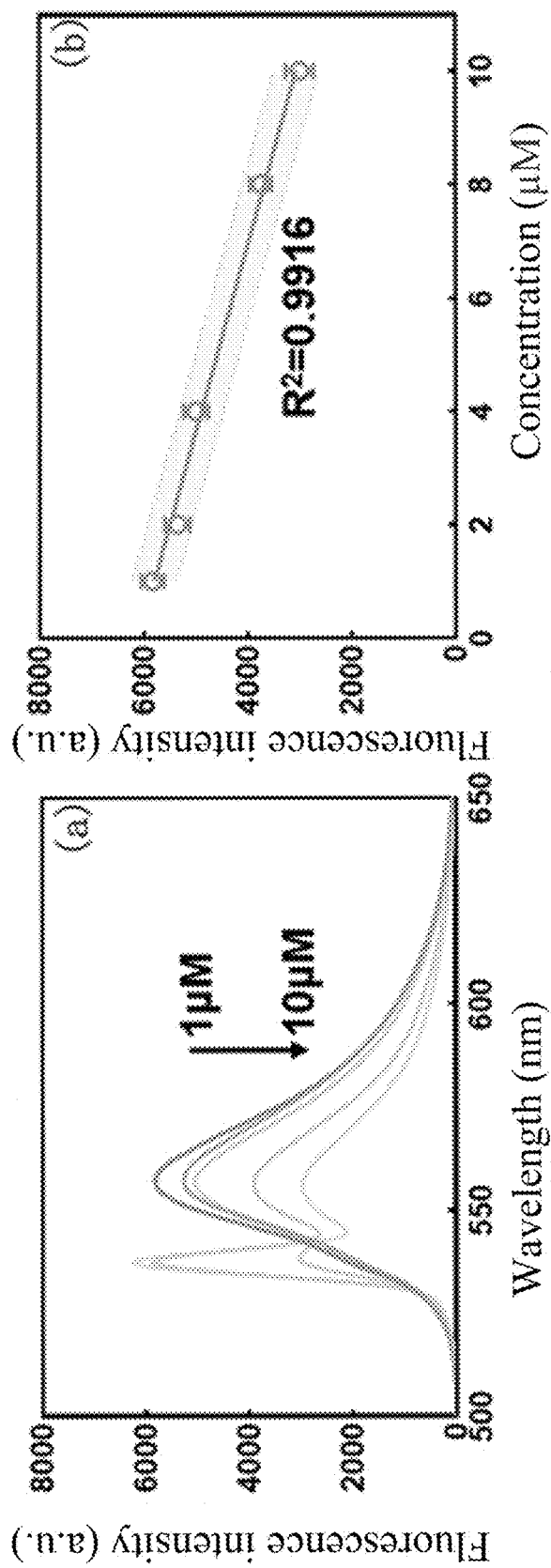
FIG. 1 shows a fluorescence spectrum and a linear standard curve of the fluorine-doped CD provided in Test Example 1 of the present application for PFOA, where (a) in FIG. 1 shows the fluorescence spectrum of the fluorine-doped CD for PFOA and (b) in FIG. 1 shows the linear standard curve of the fluorine-doped CD for PFOA.

REFERENCE NUMERALS 1. kit body; 2. light source; 3. collection window; 4. camera device mount; 5. camera device; 6. light source switch; 7. sample stage; 8. microfluidic chip; 9. upper chip; 10. sample inlet; 11. microchannel; 12. detection region; 13. enrichment chromogenic membrane; 14. gasket; and 15. lower chip.

DETAILED DESCRIPTION OF THE EMBODIMENTS

The exemplary embodiments of the present application will be described in detail below with reference to the accompanying drawings. Apparently, the embodiments described are some rather than all of the embodiments of the present application. It should be understood that the present application is not limited by the exemplary embodiments described herein.

Example 1

Preparation Method of a Fluorine-Doped CD:

The fluorine-doped CD was synthesized through one-pot solvothermal synthesis. Specific steps were as follows: 4-(diethylamino)salicylaldehyde and sodium fluoride were dissolved in deionized water and ultrasonically mixed with phosphoric acid thoroughly to produce a mixture. The 4-(diethylamino)salicylaldehyde, the sodium fluoride, and the phosphoric acid were in a volume ratio of 2:1:0.1. The mixture was placed in a reactor lined with polytetrafluoroethylene (PTFE), subjected to a reaction at 200° C. for 2 h, and cooled. Centrifugation was conducted to remove unreacted raw materials. A resulting supernatant was collected, and subjected to dialysis in a dialysis bag for 48 h to produce a sample. The sample was lyophilized for 12 h to produce the fluorine-doped CD.

The PTFE-lined reactor is mainly used in chemical laboratories and industrial production to carry out reactions requiring resistance to high temperatures, high pressures, and strongly-corrosive chemicals. PTFE has excellent chemical stability and non-adhesion, which makes PTFE an ideal lining material. The reactor can often withstand extreme temperature and pressure conditions without causing chemical decomposition or physical form changes. Laboratory reactor generally works under a pressure range of 100 atm to 500 atm (approximately 1,500 psi to 7,500 psi).

Example 2

A preparation method of a fluorine-doped CD-modified enrichment chromogenic membrane was provided, including the following steps:

Step (1): 10 g of a PVDF powder was evenly dispersed in a KOH solution under a 50° C. thermostatic water bath, ethanol was added, and stirring was conducted for 30 min. Suction filtration was conducted to collect an initial α-PVDF powder. The initial α-PVDF powder was washed with deionized water until neutral and then dried to produce a dry α-PVDF powder for later use. A concentration of KOH in the KOH solution was 56 g/L.

Step (2): The dry α-PVDF powder was added to DMF, nitrogen was introduced to expel oxygen for 30 min, and stirring was conducted for dissolution. Acrylic acid and 2,2'-azobis(isobutyronitrile) were added, and a reaction was allowed under stirring at 60° C. for 10 h. Methanol was added to convert a product into a gel precipitate. The gel precipitate was washed with deionized water to produce wet αAA-PVDF, and the wet αAA-PVDF was dried to produce dry αAA-PVDF for later use.

Step (3): 2 g of the dry αAA-PVDF obtained in the step (2) and 0.2 g of polyvinylpyrrolidone were weighed and dissolved in 20 mL of DMF, stirred at 60° C. for 12 h, and allowed to stand for 12 h to produce a casting solution. The casting solution was poured on a scrape-coating machine and scrape-coated by a scraper to produce a homogeneous substrate membrane. The substrate membrane was soaked in deionized water, during which the deionized water was changed once every 12 h.

A tannic acid powder was dissolved in a phosphate buffer with a pH of 8 to produce a tannic acid solution. A concentration of tannic acid in the tannic acid solution was 3 g/L.

UiO-66-$F_4$ and a fluorine-doped CD were weighed and dissolved in deionized water and ultrasonically dispersed to produce a dispersion of the UiO-66-$F_4$ and the fluorine-doped CD. A concentration of each of the UiO-66-$F_4$ and the fluorine-doped CD in the dispersion of the UiO-66-$F_4$ and the fluorine-doped CD was 1 g/L.

The substrate membrane prepared in the step (3) was cut to an appropriate size and subjected to a static immersion for 30 min at room temperature in each of the tannic acid solution and the dispersion of the UiO-66-$F_4$ and the fluorine-doped CD successively, such that each component was assembled on a surface of the substrate membrane for modification to produce the enrichment chromogenic membrane.

Figure 4:
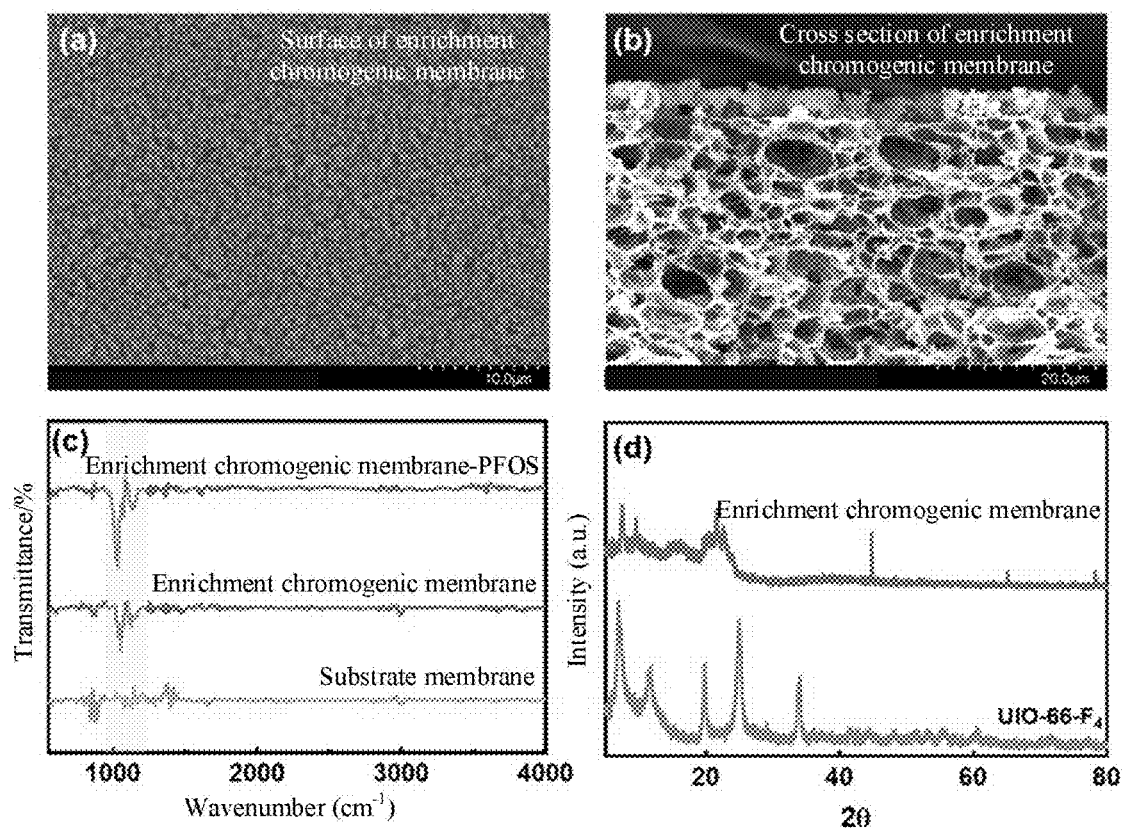
FIG. 4 shows characterization results of an enrichment chromogenic membrane provided in an exemplary embodiment of the present application, where (a) in FIG. 4 shows a scanning electron microscopy image of a surface of the enrichment chromogenic membrane, (b) in FIG. 4 shows a scanning electron microscopy image of a cross section of the enrichment chromogenic membrane, (c) in FIG. 4 shows an infrared spectrum of the enrichment chromogenic membrane, and (d) in FIG. 4 shows an X-ray diffraction (XRD) pattern of the enrichment chromogenic membrane.

FIG. 4 shows characterization results of the enrichment chromogenic membrane provided in Example 2 of the present application. (a) in FIG. 4 shows a scanning electron microscopy image of a surface of the enrichment chromogenic membrane and (b) in FIG. 4 shows a scanning electron microscopy image of a cross section of the enrichment chromogenic membrane. It can be clearly seen from (a) of FIG. 4 and (b) of FIG. 4 that the fluorine-doped CD is deposited on the surface of the substrate membrane and the UiO-66-$F_4$ nanoparticles are well dispersed on the surface of the substrate membrane. It indicates that the UiO-66-$F_4$ and the fluorine-doped CD are uniformly assembled on the surface of the substrate membrane with the assistance of tannic acid to produce the enrichment chromogenic membrane. (c) in FIG. 4 shows an infrared spectrum of the enrichment chromogenic membrane. It can be seen from (c) of FIG. 4 that an absorption peak of the enrichment chromogenic membrane at about 1,000 $cm^{-1}$ is enhanced, indicating that UiO-66-$F_4$ has grown on the membrane. The enrichment chromogenic membrane has a signal peak around 1,200 $cm^{-1}$, indicating the presence of Zr—OH in the enrichment chromogenic membrane. The enrichment chromogenic membrane-PFOS (an enrichment chromogenic membrane adsorbing a PFC sample) has an obvious absorption peak near 1,000 $cm^{-1}$, which is a stretching vibration peak of a C—F bond. (d) in FIG. 4 shows an XRD pattern of the enrichment chromogenic membrane. It can be seen from (d) of FIG. 4 that the enrichment chromogenic membrane has a relatively wide peak, indicating that a surface of the enrichment chromogenic membrane has a prominent crystal structure and high crystallinity. During the preparation process, although a peak intensity of the enrichment chromogenic membrane decreases and the crystallinity of the material decreases, a position of the peak remains basically unchanged. It indicates that the basic crystal structure of UiO-66-$F_4$ still exists, but the grain size or dispersion state has changed. Therefore, it can be seen from FIG. 4 that the UiO-66-$F_4$ and the fluorine-doped CD are uniformly assembled on the surface of the substrate membrane under an action of tannic acid.

Example 3

Figure 5:
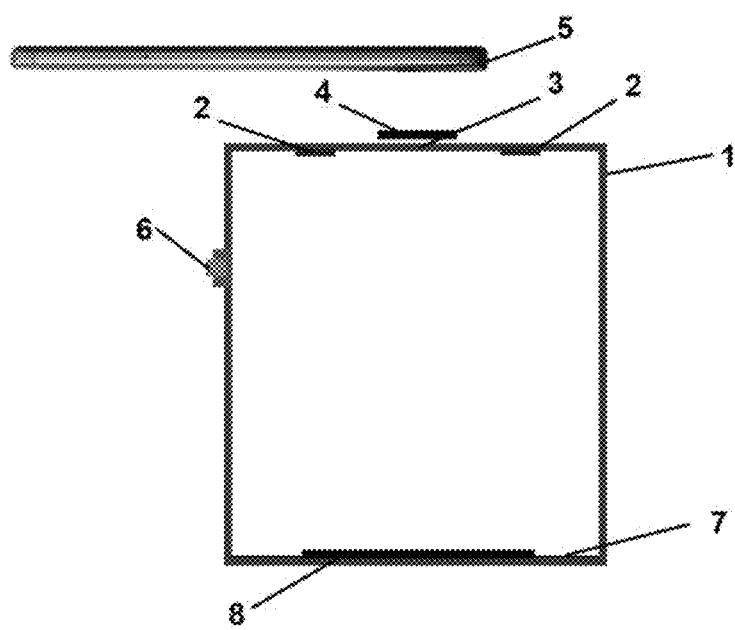
FIG. 5 is a schematic structural diagram of a membrane-based microfluidic coupling chip and a test kit used in combination therewith in an exemplary embodiment of the present application.
Figure 6:
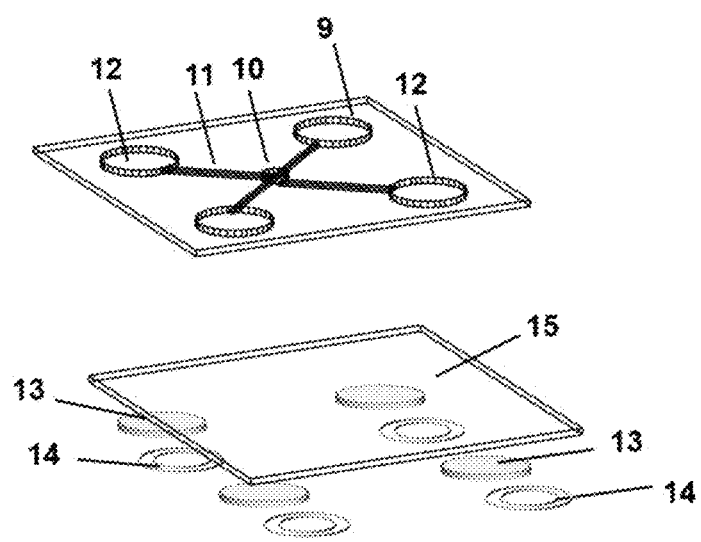
FIG. 6 is a schematic structural diagram of a membrane-based microfluidic coupling chip in an exemplary embodiment of the present application.

FIG. 5 is a schematic structural diagram of a membrane-based microfluidic coupling chip and a test kit used in combination therewith in an exemplary embodiment of the present application. FIG. 6 is a schematic structural diagram of a membrane-based microfluidic coupling chip in an exemplary embodiment of the present application. As shown in FIG. 5 and FIG. 6, the test kit can be used to detect PFCs in water. The test kit includes an enrichment chromogenic membrane 13, a kit body 1, light sources 2, a collection window 3, a camera device mount 4, a camera device 5, a light source switch 6, a sample stage 7, and a microfluidic chip 8.

The enrichment chromogenic membrane 13 is prepared by the above preparation method. The collection window 3 is formed at a top of the kit body 1, the sample stage 7 is arranged on an inner wall of a bottom of the kit body 1, the collection window 3 is arranged in parallel with the sample stage 7, and the microfluidic chip 8 is placed on the sample stage 7. The camera device mount 4 is arranged at a side of the collection window 3, and the camera device 5 is placed on the camera device mount 4. The camera device 5 is configured to photograph the enrichment chromogenic membrane 13 on the sample stage 7 through the collection window 3. The light sources 2 are arranged at the top of the kit body 1, and are symmetrically arranged at two sides of the collection window 3. The light sources 2 are ultraviolet light sources, and the ultraviolet light sources are configured to irradiate the enrichment chromogenic membrane 13.

The microfluidic chip 8 includes an upper chip 9, a lower chip 15, and a gasket 14. The upper chip 9 is provided with a sample inlet 10, a microchannel 11, the enrichment chromogenic membrane 13, and a detection region 12. The sample inlet 10 is formed at a central position of the upper chip 9. The detection region 12 communicates with the sample inlet 10 through the microchannel 11. The enrichment chromogenic membrane 13 is placed in the detection region 12. The gasket 14 is arranged at a bottom of the enrichment chromogenic membrane 13. The upper chip 9 and the lower chip 15 are connected together through the gasket 14.

Specifically, a sample can be injected into the sample inlet 10, such that the sample enters the detection region 12 through the microchannel 11, penetrates through the enrichment chromogenic membrane 13, and then is discharged. After a specified volume of a sample was injected, the microfluidic chip 8 was placed on the sample stage 7, and the camera device 5 (which could be a mobile phone) was placed on the camera device mount 4. The light sources 2 were turned on through the light source switch 6 to acquire an image. After the image was acquired, RGB values of a chromogenic region were extracted from the image. A relationship between RGB values and concentrations was analyzed to produce a standard curve. PFC standard solutions with different concentrations were adsorbed on the enrichment chromogenic membrane through the microfluidic chip. A color of the membrane gradually changed with the increase of a concentration, resulting in a distinct color response. RGB values of a sample to be tested could be substituted into the standard curve to obtain a concentration of PFCs in the sample to be tested.

Test Example 1

Fluorescence spectra and linear standard curves of the prepared fluorine-doped CD (CDs-F) for PFOA, PFOS, and PPVE were determined.

Figure 2:
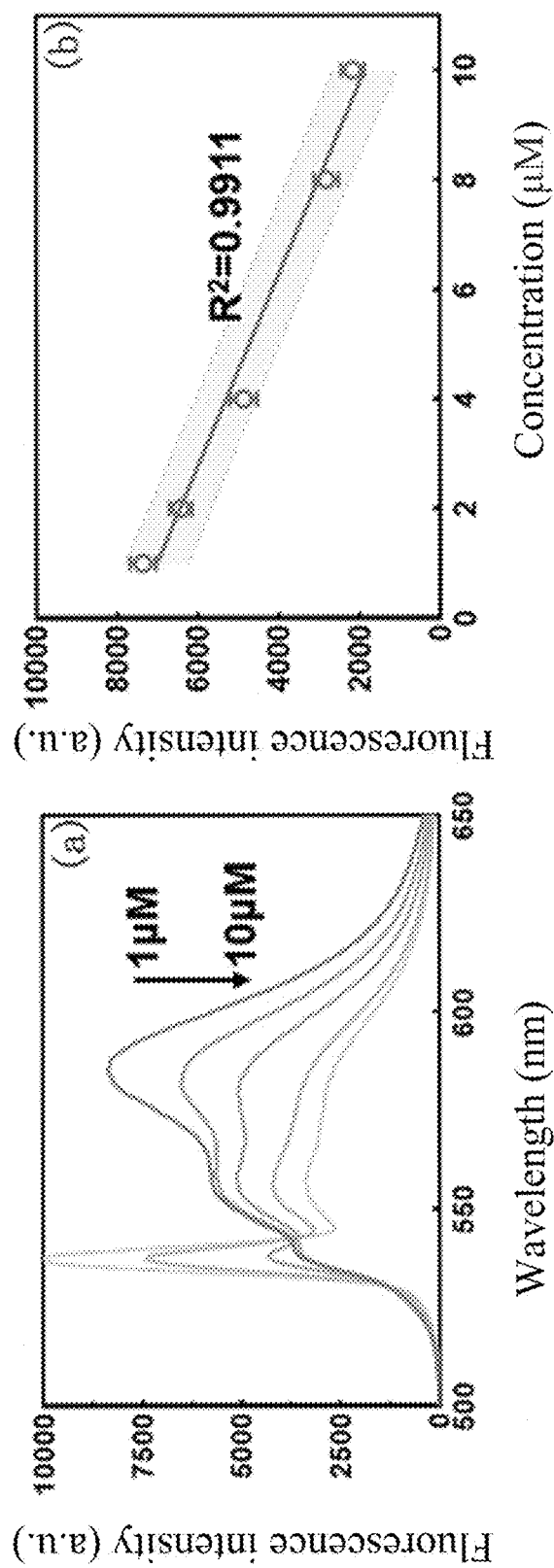
FIG. 2 shows a fluorescence spectrum and a linear standard curve of the fluorine-doped CD provided in Test Example 1 of the present application for PFOS, where (a) in FIG. 2 shows the fluorescence spectrum of the fluorine-doped CD for PFOS and (b) in FIG. 2 shows the linear standard curve of the fluorine-doped CD for PFOS.
Figure 3:
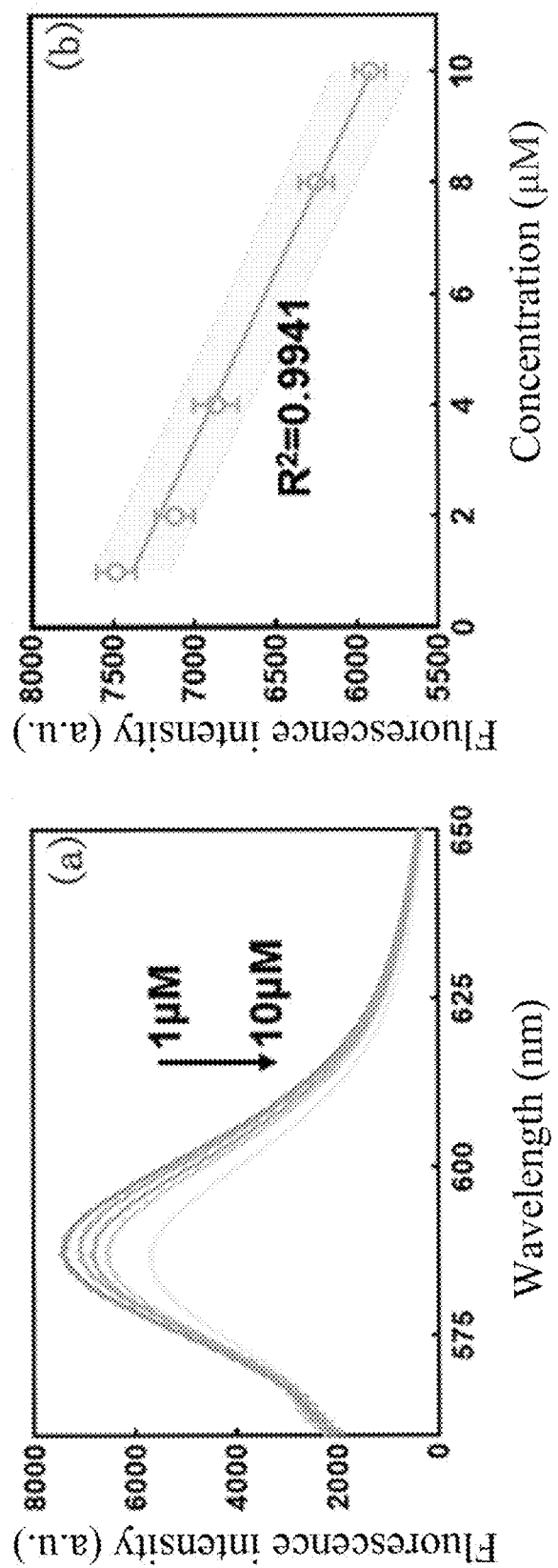
FIG. 3 shows a fluorescence spectrum and a linear standard curve of the fluorine-doped CD provided in Test Example 1 of the present application for PPVE, where (a) in FIG. 3 shows the fluorescence spectrum of the fluorine-doped CD for PPVE and (b) in FIG. 3 shows the linear standard curve of the fluorine-doped CD for PPVE.

FIG. 1 shows a fluorescence spectrum and a linear standard curve of the fluorine-doped CD for PFOA provided in Example 1 of the present application. (a) in FIG. 1 shows the fluorescence spectrum of the fluorine-doped CD for PFOA. (b) in FIG. 1 shows the linear standard curve of the fluorine-doped CD for PFOA. FIG. 2 shows a fluorescence spectrum and a linear standard curve of the fluorine-doped CD provided in Example 1 of the present application for PFOS. (a) in FIG. 2 shows the fluorescence spectrum of the fluorine-doped CD for PFOS. (b) in FIG. 2 shows the linear standard curve of the fluorine-doped CD for PFOS. FIG. 3 shows a fluorescence spectrum and a linear standard curve of the fluorine-doped CD provided in Example 1 of the present application for PPVE. (a) in FIG. 3 shows the fluorescence spectrum of the fluorine-doped CD for PPVE. (b) in FIG. 3 shows the linear standard curve of the fluorine-doped CD for PPVE. As shown in FIG. 1 to FIG. 3, after the fluorine-doped CD was prepared, in order to test the properties of the fluorine-doped CD, the fluorescence quenching of the fluorine-doped CD by PFOA, PFOS, and PPVE at concentrations of 1 µM, 2 µM, 4 µM, 8 µM, and 10 µM was first tested by a fluorescence spectrometer. Fluorescence values tested at different concentrations of PFOA, PFOS, and PPVE were then linearly fitted. A relatively considerable fitted value was obtained at each concentration. It indicates that the fluorine-doped CD can be used for detecting the above PFCs.

Test Example 2

Figure 7:
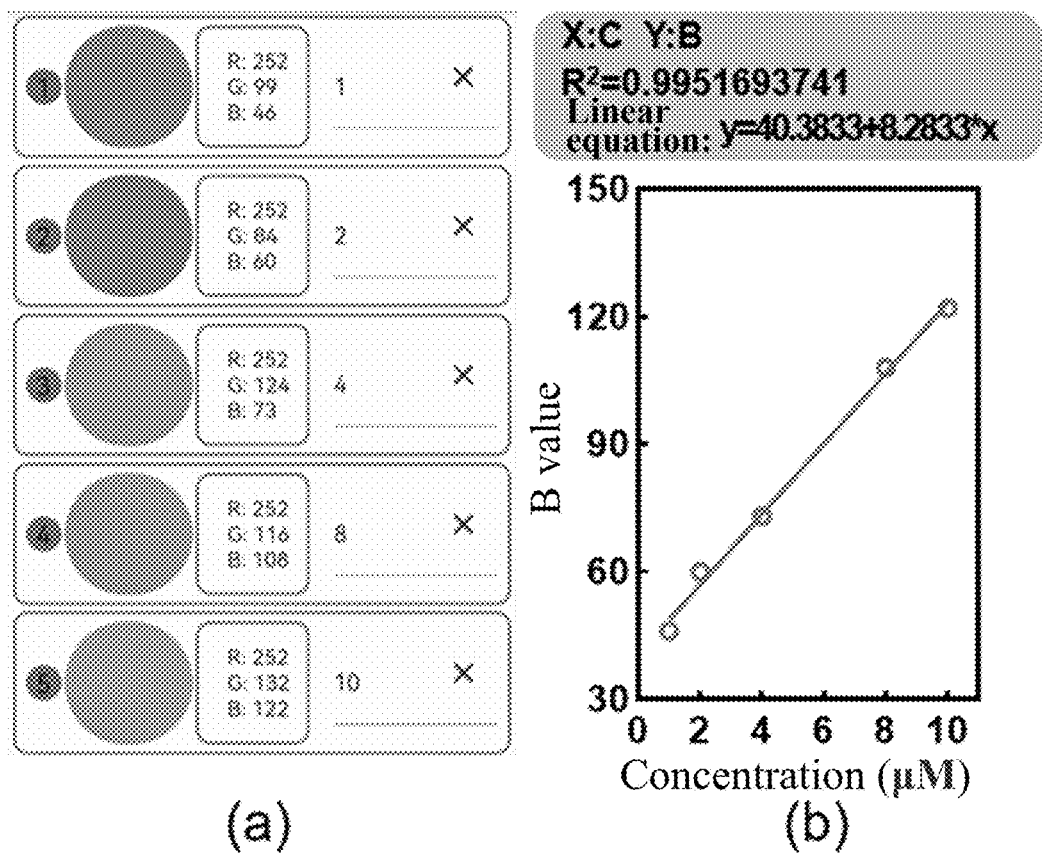
FIG. 7 shows central region images extracted from fluorescence images of and a linear standard curve of an enrichment chromogenic membrane for PFOA provided in Test Example 2 of the present application, where (a) in FIG. 7 shows the central region images extracted from the fluorescence images of the enrichment chromogenic membrane for PFOA and (b) in FIG. 7 shows the linear standard curve of the enrichment chromogenic membrane for PFOA.

PFOA standard solutions with concentrations of 1 µM, 2 µM, 4 µM, 8 µM, and 10 µM respectively were adsorbed on the enrichment chromogenic membrane through the microfluidic chip. A color of the enrichment chromogenic membrane gradually changed with the increase of a concentration, resulting in a distinct color response. The enrichment chromogenic membrane was photographed by the mobile phone to acquire colorimetric images. Then the colorimetric images were imported into software, and RGB values of chromogenic regions were extracted. A linear relationship between B values and PFOA concentrations was analyzed to produce a standard curve. FIG. 7 shows central region images extracted from fluorescence images of and a linear standard curve of the enrichment chromogenic membrane for PFOA provided in Test Example 2 of the present application. (a) in FIG. 7 shows the central region images extracted from the fluorescence images of the enrichment chromogenic membrane for PFOA. (b) in FIG. 7 shows the linear standard curve of the enrichment chromogenic membrane for PFOA. As shown in FIG. 7, a B value of a sample to be tested could be substituted into the standard curve to obtain a concentration of PFOA in the sample to be tested.

Test Example 3

Figure 8:
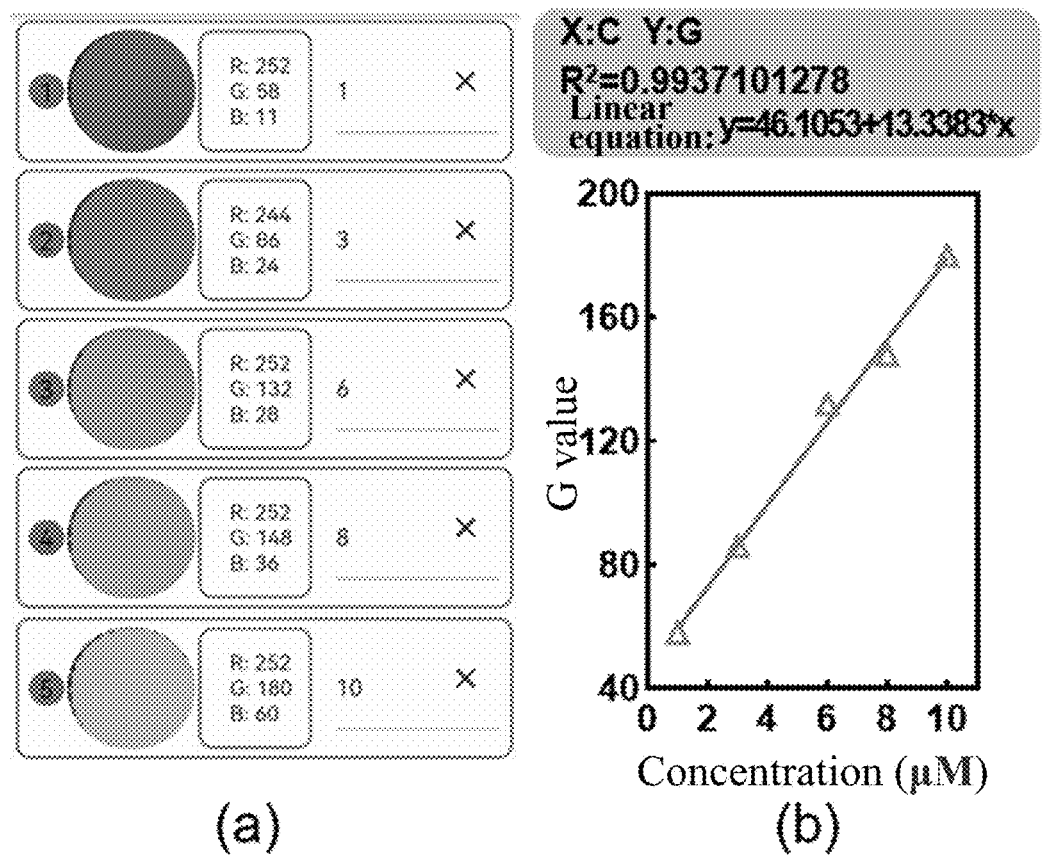
FIG. 8 shows central region images extracted from fluorescence images of and a linear standard curve of an enrichment chromogenic membrane for PFOS provided in Test Example 3 of the present application, where (a) in FIG. 8 shows the central region images extracted from the fluorescence images of the enrichment chromogenic membrane for PFOS and (b) in FIG. 8 shows the linear standard curve of the enrichment chromogenic membrane for PFOS.

PFOS standard solutions with concentrations of 1 µM, 3 µM, 6 µM, 8 µM, and 10 µM respectively were adsorbed on the enrichment chromogenic membrane through the microfluidic chip. A color of the enrichment chromogenic membrane gradually changed with the increase of a concentration, resulting in a distinct color response. The enrichment chromogenic membrane was photographed by the mobile phone to acquire colorimetric images. Then the colorimetric images were imported into software, and G values of chromogenic regions were extracted. A linear relationship between RGB values and PFOS concentrations was analyzed to produce a standard curve. FIG. 8 shows central region images extracted from fluorescence images of and a linear standard curve of the enrichment chromogenic membrane for PFOS provided in Test Example 3 of the present application. (a) in FIG. 8 shows the central region images extracted from the fluorescence images of the enrichment chromogenic membrane for PFOS. (b) in FIG. 8 shows the linear standard curve of the enrichment chromogenic membrane for PFOS. As shown in FIG. 8, a G value of a sample to be tested could be substituted into the standard curve to obtain a concentration of PFOS in the sample to be tested.

Test Example 4

Figure 9:
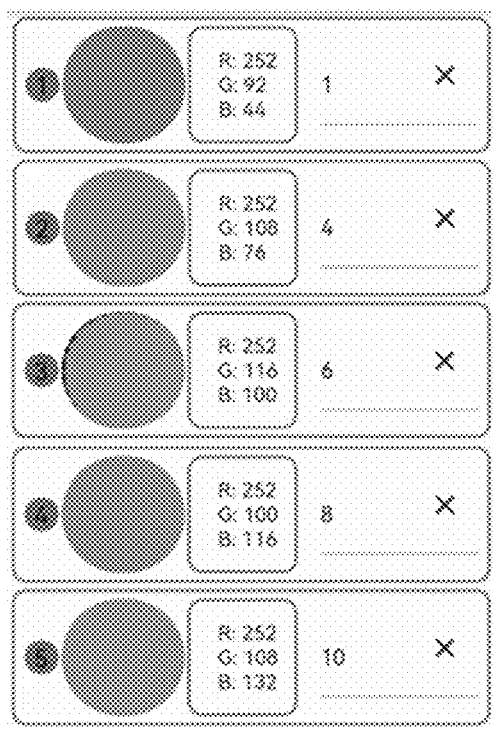
FIG. 9 shows central region images extracted from fluorescence images of and a linear standard curve of an enrichment chromogenic membrane for PPVE provided in Test Example 4 of the present application, where (a) in FIG. 9 shows the central region images extracted from the fluorescence images of the enrichment chromogenic membrane for PPVE and (b) in FIG. 9 shows the linear standard curve of the enrichment chromogenic membrane for PPVE.
Figure 9:
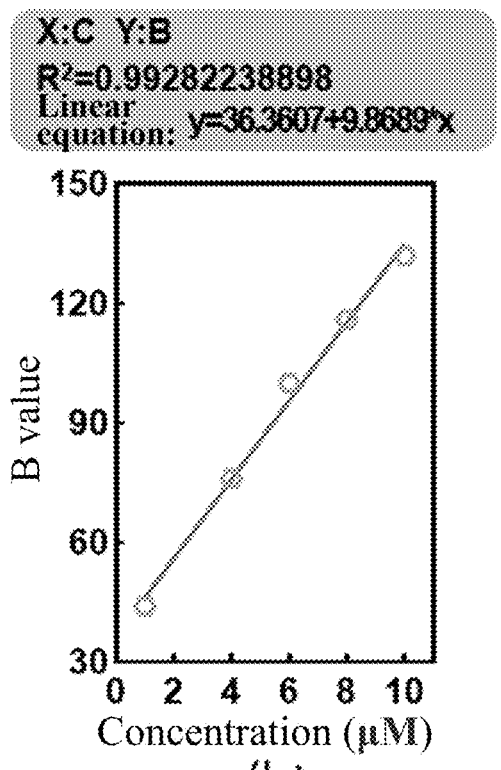

PPVE standard solutions with concentrations of 1 µM, 4 µM, 6 µM, 8 µM, and 10 µM respectively were adsorbed on the enrichment chromogenic membrane through the microfluidic chip. A color of the enrichment chromogenic membrane gradually changed with the increase of a concentration, resulting in a distinct color response. The enrichment chromogenic membrane was photographed by the mobile phone to acquire colorimetric images. Then the colorimetric images were imported into software, and RGB values of chromogenic regions were extracted. A linear relationship between B values and PPVE concentrations was analyzed to produce a standard curve. FIG. 9 shows central region images extracted from fluorescence images of and a linear standard curve of the enrichment chromogenic membrane for PPVE provided in Test Example 4 of the present application. (a) in FIG. 9 shows the central region images extracted from the fluorescence images of the enrichment chromogenic membrane for PPVE. (b) in FIG. 9 shows the linear standard curve of the enrichment chromogenic membrane for PPVE. As shown in FIG. 9, a B value of a sample to be tested could be substituted into the standard curve to obtain a concentration of PPVE in the sample to be tested.

Test Example 5

Figure 10:
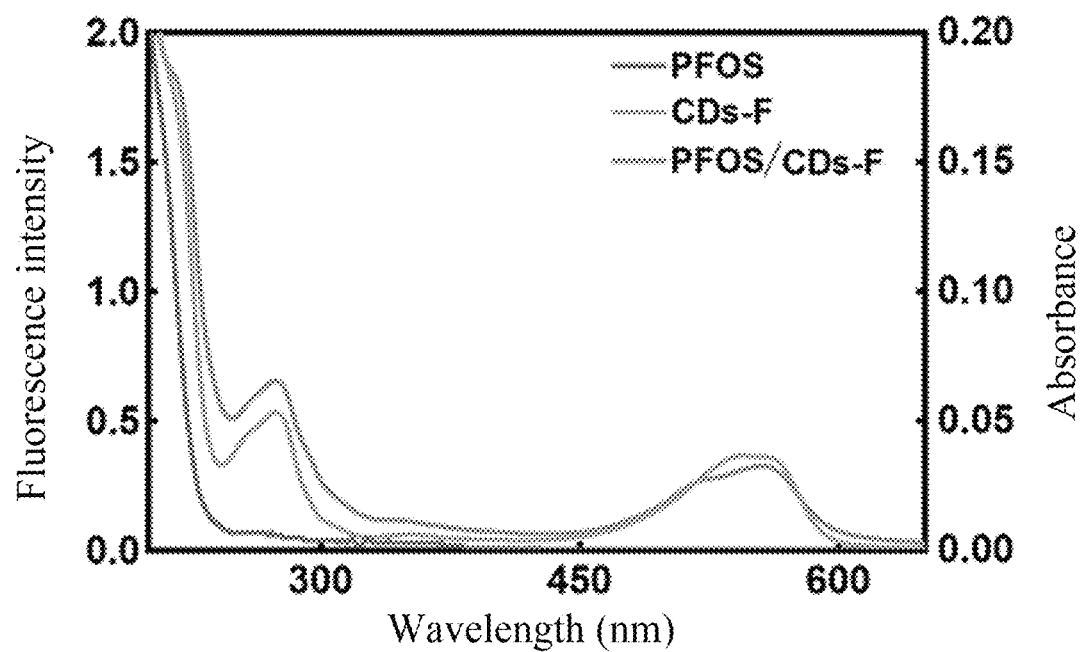
FIG. 10 shows ultraviolet spectra of PFOS, CDs-F, and PFOS/CDs-F provided in Test Example 5 of the present application.

In order to investigate a fluorescence quenching mechanism of PFOS on CDs-F, ultraviolet spectra of PFOS, CDs-F, and PFOS/CDs-F (fluorine-doped CD with PFOS was added) each were tested. FIG. 10 shows ultraviolet spectra of PFOS, CDs-F, and PFOS/CDs-F provided in Test Example 5 of the present application. As shown in FIG. 10, no new ultraviolet absorption peak appears after PFOS is added to CDs-F, indicating that no non-radiative ground-state complex is produced from CDs and PFOS. Thus, the possibility of static quenching is ruled out.

Figure 11:
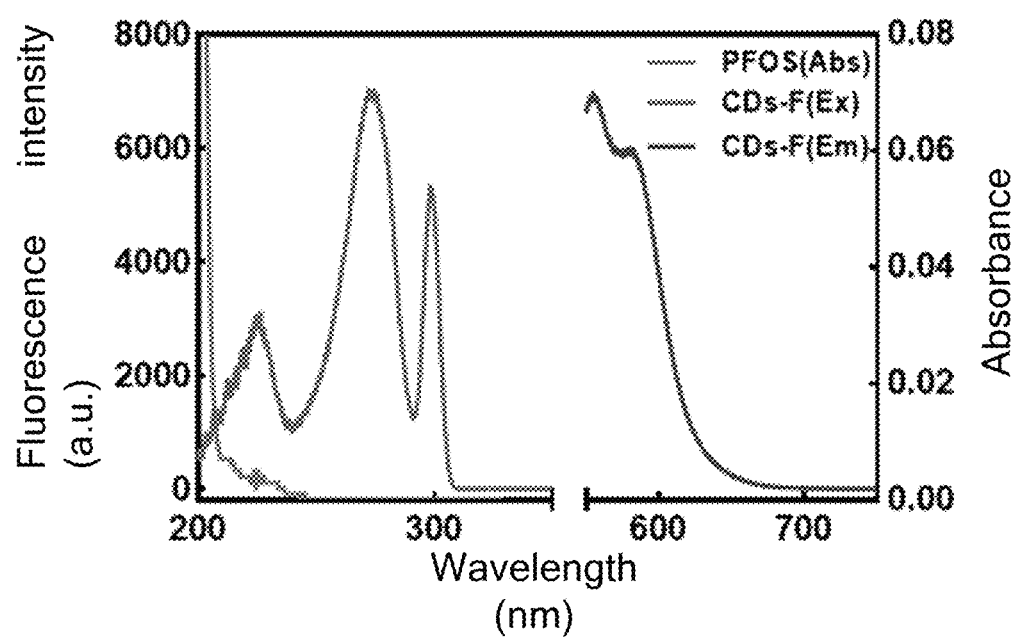
FIG. 11 shows excitation and emission spectra of CDs-F and an ultraviolet spectrum of PFOS provided in Test Example 5 of the present application.

FIG. 11 shows excitation and emission spectra of CDs-F and an ultraviolet absorption spectrum of PFOS provided in Test Example 5 of the present application. As shown in FIG. 11, the excitation spectrum of CDs-F partially overlaps with the ultraviolet absorption spectrum of PFOS in a range of 215 nm to 246 nm, indicating that the quenching mechanism may be the inner filter effect or fluorescence resonance energy transfer.

Figure 12:
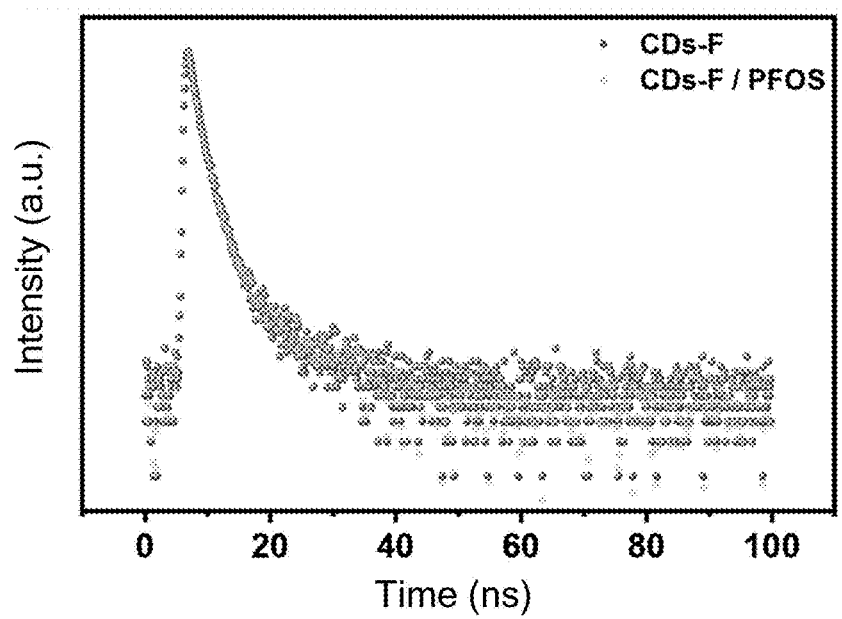
FIG. 12 shows fluorescence lifetime changes of CDs-F before and after PFOS addition provided in Test Example 5 of the present application.

FIG. 12 shows fluorescence lifetime changes of CDs-F before and after PFOS addition provided in Test Example 5 of the present application. As shown in FIG. 12, average fluorescence lifetimes of CDs-F in the absence and presence of PFOS are 137.22 ps and 137.83 ps, respectively, indicating that the introduction of PFOS does not alter the fluorescence lifetime of CDs-F. Thus, the possibility of fluorescence resonance energy transfer is ruled out. It can be known that the fluorescence quenching of CDs-F by PFOS is caused by the inner filter effect rather than other potential mechanisms.

In combination with the FT-IR analysis above, the adsorption of PFOS can be facilitated through molecular diffusion, electrostatic interactions, hydrophobic interactions, hydrogen bonding, and F—F bonding due to an ion exchange between fluoride ions and hydroxyl ions. 1. A target compound can diffuse into pores of the enrichment chromogenic membrane through a close contact with UiO-66-$F_4$. 2. The possible electrostatic adsorption between a sulfonate/carboxylate group of PFOS and a coordinatively unsaturated $Zr^{4+}$ sites in UiO-66-$F_4$ may serve as a key factor for efficient extraction. 3. PFOS can be adsorbed through hydrophobic interactions between hydrophobic moieties, coordination of PFOS with zirconium clusters, or fluorophilic interactions. 4. There may be hydrogen bonding interactions between water ligands coordinated to Zr and PFOS. Moreover, the F—F stacking interaction between F of PFOS and F in the UiO-66-$F_4$ separation membrane contributes to the adsorption for PFOS.

In the present application, PFC standard solutions with different concentrations are adsorbed on the enrichment chromogenic membrane through the microfluidic chip. A color of the enrichment chromogenic membrane gradually changes with the increase of a concentration, resulting in a distinct color response. The enrichment chromogenic membrane is photographed by the mobile phone to acquire colorimetric images. Then the colorimetric images are imported into software, and RGB values of chromogenic regions are extracted. A linear relationship between RGB values and PFC concentrations is analyzed to produce a standard curve. RGB values of a sample to be tested can be substituted into the standard curve to obtain a concentration of PFCs in the sample to be tested. Colorimetric images are acquired by a smart phone, and color blocks in each image are subjected to extraction and analysis. Thus, the present application enables a wide detection range. In the present application, he fluorine-doped CD serves as a chromogenic agent to achieve the detection of PFCs, and accordingly, the enrichment chromogenic membrane is prepared in combination with UiO-66-$F_4$. The enrichment chromogenic membrane allows convenient detection and can achieve the in-situ monitoring of PFCs in water.

What is claimed is:

1. A method for preparing a fluorine-doped carbon dot (CD)-modified enrichment chromogenic membrane, comprising:

preparation of a substrate membrane: modifying polyvinylidene fluoride (PVDF) to produce αAA-PVDF; dissolving the αAA-PVDF and polyvinylpyrrolidone in N,N-dimethylformamide (DMF), stirring at 60° C. to 70° C. for 10 h to 12 h, and allowing to stand for 10 h to 18 h to produce a mixed solution; pouring the mixed solution on a scrape-coating machine, and scrape-coating to form the substrate membrane; and soaking the substrate membrane in deionized water for later use;

preparation of a tannic acid solution: dissolving a tannic acid powder in a phosphate buffer to produce the tannic acid solution;

dispersing a fluorine-doped CD and UiO-66-F4 in deionized water, and conducting an ultrasonic treatment to produce a dispersion of the UiO-66-F4 and the fluorine-doped CD; and cutting the substrate membrane, and subjecting a cut substrate membrane to a static immersion in the tannic acid solution for 20 min to 60 min and then to a static immersion in the dispersion of the UiO-66-F4 and the fluorine-doped CD for 20 min to 60 min to produce the enrichment chromogenic membrane, wherein the PVDF is modified through the following steps:

step (1), dispersing a PVDF powder in a KOH solution at 50° C. to 60° C., adding ethanol, and stirring for 20 min to 60 min; and conducting suction filtration to collect an initial α-PVDF powder, washing the initial α-PVDF powder with deionized water until neutral to produce a wet α-PVDF powder, and drying the wet α-PVDF powder to produce a dry α-PVDF powder for later use; and step (2), adding the dry α-PVDF powder obtained in the step (1) to DMF, introducing nitrogen to expel oxygen for 20 min to 40 min, and stirring for dissolution; adding acrylic acid and 2,2'-azobis(isobutyronitrile), stirring at a constant temperature of 55° C. to 70° C. to allow a reaction for 8 h to 12 h; and adding methanol for precipitation to produce a precipitate, washing the precipitate with deionized water to produce a wet αAA-PVDF powder, and drying the wet αAA-PVDF powder to produce a dry αAA-PVDF powder for later use.

2. The method according to claim 1, wherein the fluorine-doped CD is synthesized through one-pot solvothermal synthesis as follows: dissolving 4-(diethylamino) salicylaldehyde and sodium fluoride in water to produce an aqueous solution, and ultrasonically mixing the aqueous solution with phosphoric acid thoroughly to produce a mixture; placing the mixture in a reactor, and allowing a reaction under heating; cooling, and removing unreacted raw materials; collecting a resulting supernatant, and conducting dialysis to produce a sample; and lyophilizing the sample to produce the fluorine-doped CD.

3. The method according to claim 2, wherein the 4-(diethylamino) salicylaldehyde, the sodium fluoride, and the phosphoric acid are in a volume ratio of (2-2.5):(1-2):(0.05-0.15).

4. The method according to claim 2, wherein the reaction under heating is conducted at 180° C. to 220° C., and/or, the reaction under heating is conducted for 1 h to 3 h; and/or, the dialysis is conducted in a dialysis bag for 24 h to 48 h.

5. The method according to claim 1, wherein during the preparation of the tannic acid solution, the tannic acid powder is dissolved in a phosphate buffer with a pH of 8 to produce the tannic acid solution, and a concentration of tannic acid in the tannic acid solution is 2 g/L to 4 g/L.

6. The method according to claim 1, wherein a concentration of KOH in the KOH solution is 56 g/L.

7. The method according to claim 1, wherein a concentration of each of the UiO-66-F4 and the fluorine-doped CD in the dispersion of the UiO-66-F4 and the fluorine-doped CD is 1 g/L.

* * * * *